United States Patent [19]
Ruyter

[11] 3,984,641
[45] Oct. 5, 1976

[54] SYSTEM FOR SWITCHING AND SAFEGUARDING DATA IN TIME-DIVISION MULTIPLEX SWITCHING NETWORKS

[75] Inventor: Hinrich Ruyter, Schwieberdingen, Germany

[73] Assignee: International Standard Electric Corporation, New York, N.Y.

[22] Filed: July 30, 1974

[21] Appl. No.: 493,024

[30] Foreign Application Priority Data
Aug. 1, 1973  Germany............................ 2339008

[52] U.S. Cl. ........................ 179/15 BS; 178/69.5 R
[51] Int. Cl.² ............................................. H04J 3/06
[58] Field of Search .................... 179/15 BS, 15 AF; 178/69.5 R

[56] References Cited
UNITED STATES PATENTS
3,564,414  2/1971  Ebert ............................. 179/15 Af
3,569,631  3/1971  Johannes ....................... 179/15 AF
3,668,645  6/1972  Reymond ................. 179/15 AF UX Primary Examiner—Kathleen H. Claffy
Assistant Examiner—E. Matt Kemeny
Attorney, Agent, or Firm—James B. Raden; Marvin M. Chaban

[57] ABSTRACT

A system is disclosed for safeguarding data against slip in signals occurring in interfaces between exchanges employing different exchange clock rates. Suitably connected storage arrangements cause the instants of slip compensation in both directions of transmission to coincide. In this way, omission of a signal in one direction of transmission results in a signal being inserted in the other direction and prevents the loss of data.

6 Claims, 14 Drawing Figures

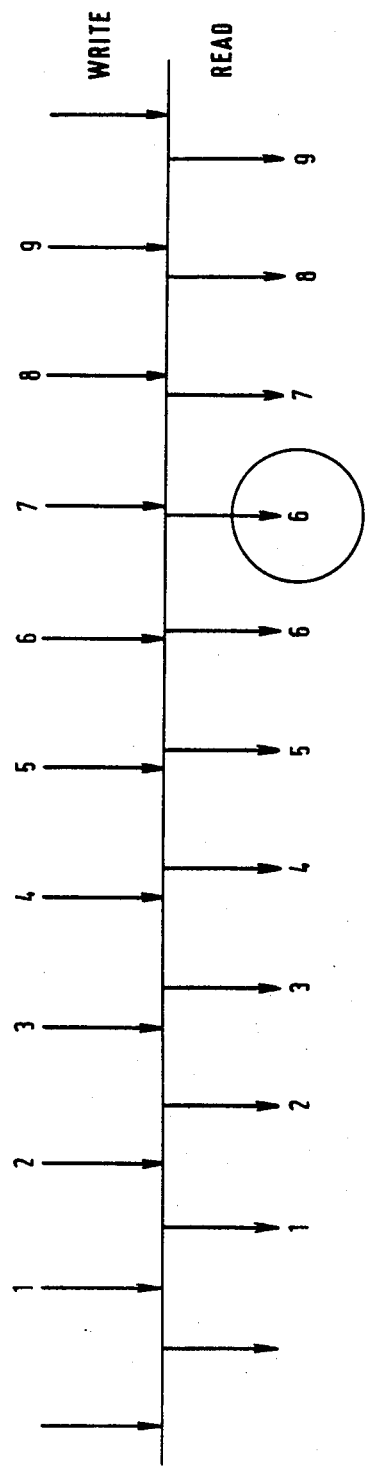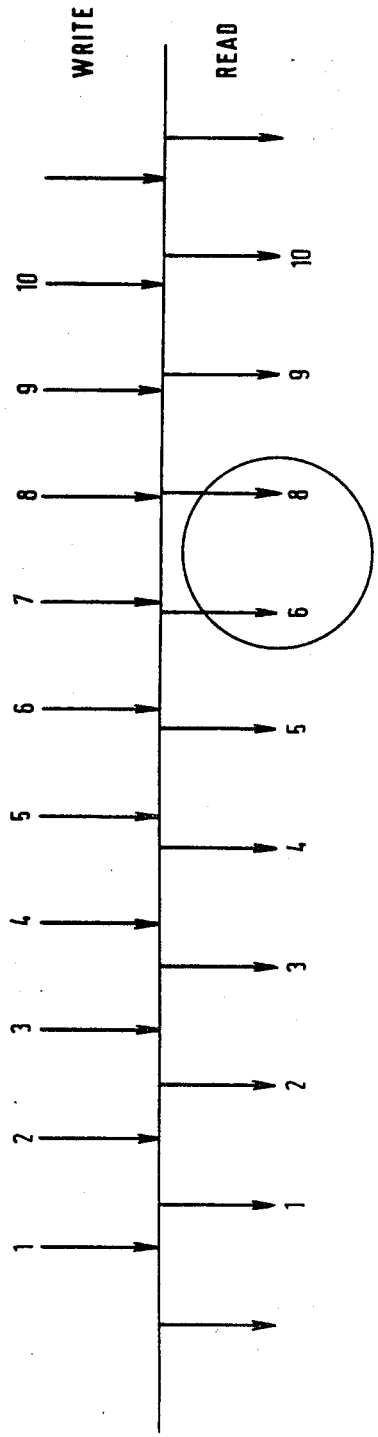

SYSTEM FOR SWITCHING AND SAFEGUARDING DATA IN TIME-DIVISION MULTIPLEX SWITCHING NETWORKS

BACKGROUND OF THE INVENTION

1. Field of the Invention

The present invention relates to a system for switching and safeguarding data in time-division-multiplex switching networks in which both the two transmission paths between two neighboring time-division-multiplex exchanges, which paths are provided for one direction of transmission each, and the input circuit of one exchange, which input circuit is connected to the transmission paths and represents a synchronous group, are operated at the clock rate of said one exchange, and in which the input circuit lying opposite said input circuit and representing an asynchronous group is operated so that read and write operations to or from the transmission paths take place at the clock rate of said one exchange, while read and write operations to or from the switching grid of the other exchange take place at the clock rate of the other exchange.

2. Description of the Prior Art

Such an arrangement is disclosed in German Published Application (DT-OS) 2,048,734, corresponding to U.S. Pat. No. 3,725,590. The circuit arrangement shown there (FIG. 2) differs from conventional arrangements (FIG. 1) especially in that the "interfaces" between the different clock rates of the neighboring exchanges are combined in one exchange (asynchronous group), while the other exchange has no such interface (synchronous group). The difference between the clock rates used by neighboring exchanges results in so-called slip at the interfaces, i.e., if data to be switched arrive at an exchange at a clock rate higher than the clock rate of this exchange, incoming data must be suppressed in given time intervals and cannot be switched. Conversely, if the clock rate in the exchange is higher, individual items of the information arriving at a lower clock rate may be switched doubly. These errors may also occur in synchronous switching networks.

If the information to be switched in such a case consists of pulse-code-modulated speech, this slip has no effect within certain limits, because it does not endanger the intelligibility of the speech information to be switched. A few hundred slips per minute are considered still tolerable (see, for example, CCITT, Special Study Group D, COM Sp. D-No. 188 (1971). The trend, however, is towards also switching data through time-division-multiplex switching networks, even though telephone traffic is preponderant (see, for example, H. Pausch: "Developments and Plans . . . Germany", NTZ (1972), No. 9, pp. 416 to 418).

In the case of data, the problem of slip is more serious because the omission or addition of a data item falsifies this data on the whole and may even make it useless.

SUMMARY OF THE INVENTION

It is therefore an object of the present invention to provide a system for safeguarding data in time-division-multiplex switching networks. The invention is characterized in that devices in the asynchronous switching group correlate slips between signals transmitted in the two transmission paths and particularly cause said slips to coincide in time. Check devices at one of two stations exchanging data via the time-division-multiplex switching network transmit check signals. Corresponding check devices in the remote station participating in the data exchange detect any variations in the incoming check signals and, following detection of such a variation, initiate switching operations causing the respective data items of both transmission paths to be transmitted anew or corrected.

An advantage of a data-safeguarding system according to the invention is that, because of the unambiguous slip correlation between both data paths, check signals must be added to the data in one direction only, which necessitates less redundancy on the data path.

A first embodiment of a system according to the invention is characterized in that the devices consist of two storages which are of identical construction. Each storage is allotted to one direction of transmission, and the storages are coupled together in such a manner that the sum of the delay periods of an incoming data item and of the associated outgoing data item is equal to one frame period or to an integral multiple thereof.

A second embodiment of a system according to the invention is characterized in that the devices consist of a main storage whose locations are available to both incoming and outgoing data items. In this embodiment, the sum of the delay periods of incoming (outgoing) and outgoing (incoming) data items are made equal to one frame period or to an integral multiple thereof.

A third embodiment of a system according to the invention is characterized in that the devices consist of a main storage allotted to both directions of transmission, an auxiliary storage, and a direct path which are so controlled that delays in the switching grid of one exchange are included in the sum of the delay periods.

In the case of the system according to the invention having a main storage, another embodiment is characterized in that a signal having passed from one transmission path to the other transmission path as a result of slip is detected and extracted in the data-receiving station by check devices.

In the case of the system according to the invention having a main storage or a main storage plus an auxiliary storage, other preferred embodiments of the invention are characterized in that the signals on one transmission path differ from the signals on the other transmission path in such a manner that a signal having passed from one transmission path to the other as a result of slip can be recognized there as being extraneous and then suppressed.

This latter embodiment has the advantage that the transmission of special check signals may be partly dispensed with, thus permitting the signals which are transmitted on one transmission path, anyway, to be used as check signals provided that they can be distinguished from the data items being transmitted on the other transmission path.

BRIEF DESCRIPTION OF THE DRAWINGS

The invention will now be explained with reference to the accompanying drawings, in which:

FIGS. 3 and 3b illustrate the two kinds of slip;

DESCRIPTION OF PREFERRED EMBODIMENTS

Figure 1:
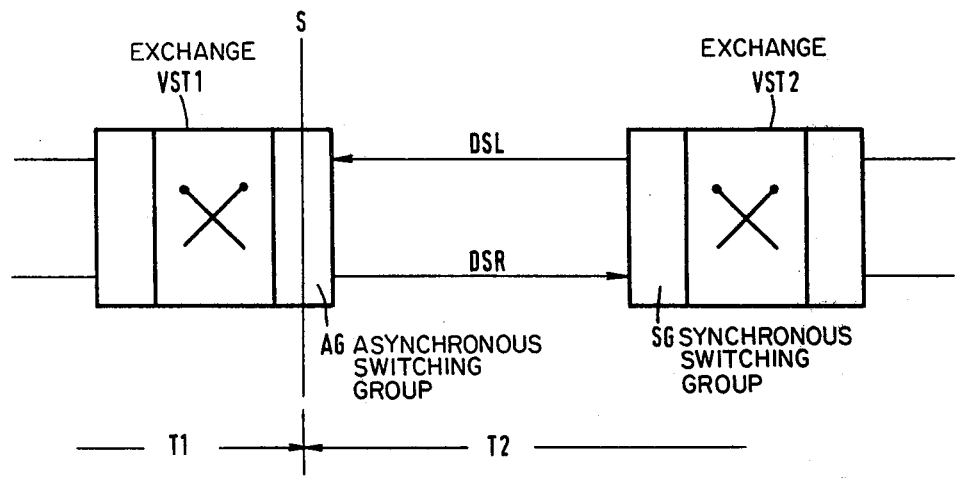
FIG. 1 is a block diagram showing two neighboring PCM exchanges and the transmission paths.

FIG. 1 shows a block diagram of two neighboring PCM exchanges. The transmission paths DSL and DSR as well as the exchange VST2 are operated at the exchange clock rate T2.

The exchange VST2 therefore contains a synchronous switching group SG as its input circuit. The exchange VST1 operates at its clock rate T1. In the asynchronous switching group AG, this results in a formal interface S which separates the equipments operating at different exchange clock rates. At this interface S, phase differences, which may be due to the clock rate, are compensated for by frame-position compensation so as to be able to switch the incoming (or outgoing) data items at the proper clock rate.

Figure 2:
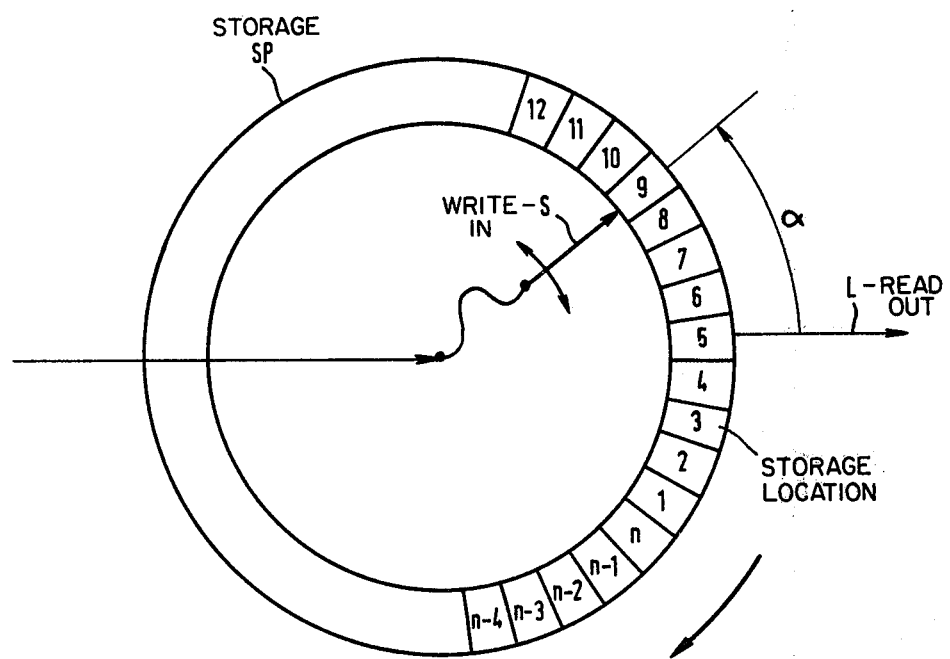
FIG. 2 shows the principle of storage for frame-position compensation.

This frame-position compensation is performed by a storage SP, whose operation for frame-position compensation in one direction is illustrated in FIG. 2. This storage SP has as many locations as a frame has time-division-multiplex channels. The storage locations are numbered from 1 to n (number of channels). In the position shown, the incoming information is being written into the channel 9 (arrow S), and the information in the channel 5 is being read out synchronously with the exchange clock rate (arrow L) and transferred to the switching grid. The angle $\alpha$ is a measure of the delay of an incoming item of information. The time sequence is obtained if the storage locations are caused to rotate clockwise. If the clock rates of the exchange and of the transmission path are exactly the same, the arrow S remains at its position in relation to the arrow L, i.e., all incoming information is delayed by a definite period of time until it is read.

If the two clock rates differ from each other, the arrow S changes its position in relation to the arrow L; if the arrow S moves across the arrow L, slip occurs, in which case there are two possibilities;

a. The information arrives at a rate slower than that necessary for switching.

The arrow S moves across the arrow L clockwise.
The delay time jumps from zero to one frame period.
The storage contents are read again.
One data item of each channel is transmitted repeatedly.

b. The information arrives faster than necessary.
The arrow S moves across the arrow L counterclockwise.
The delay time jumps from one frame period to zero.
The storage contents are overwritten before being read.
One data item of each channel is omitted.

These two types of slip are illustrated in FIGS. 3a and 3b for one channel (in this figure the data items of a channel are numbered continuously - the numbers are not channel numbers). In case a) the data item 6 is repeated; in case b) the data item 7 is omitted.

So far, frame-position compensation has been carried out in one direction only. However, such compensation must also be performed for the other direction of transmission because the interface S concerns both directions of transmission, i.e., an additional storage unit must be provided. If these two storages are operated independently of each other, slip will occur alternately and in random order in both directions of transmission. An essential feature of the present invention, however, is the common control of the two storages such that an omission of a data item in one direction coincides in time with a repetition of a data item in the other direction, i.e., an unambiguous correlation of the slip in both directions is created.

Figure 4:
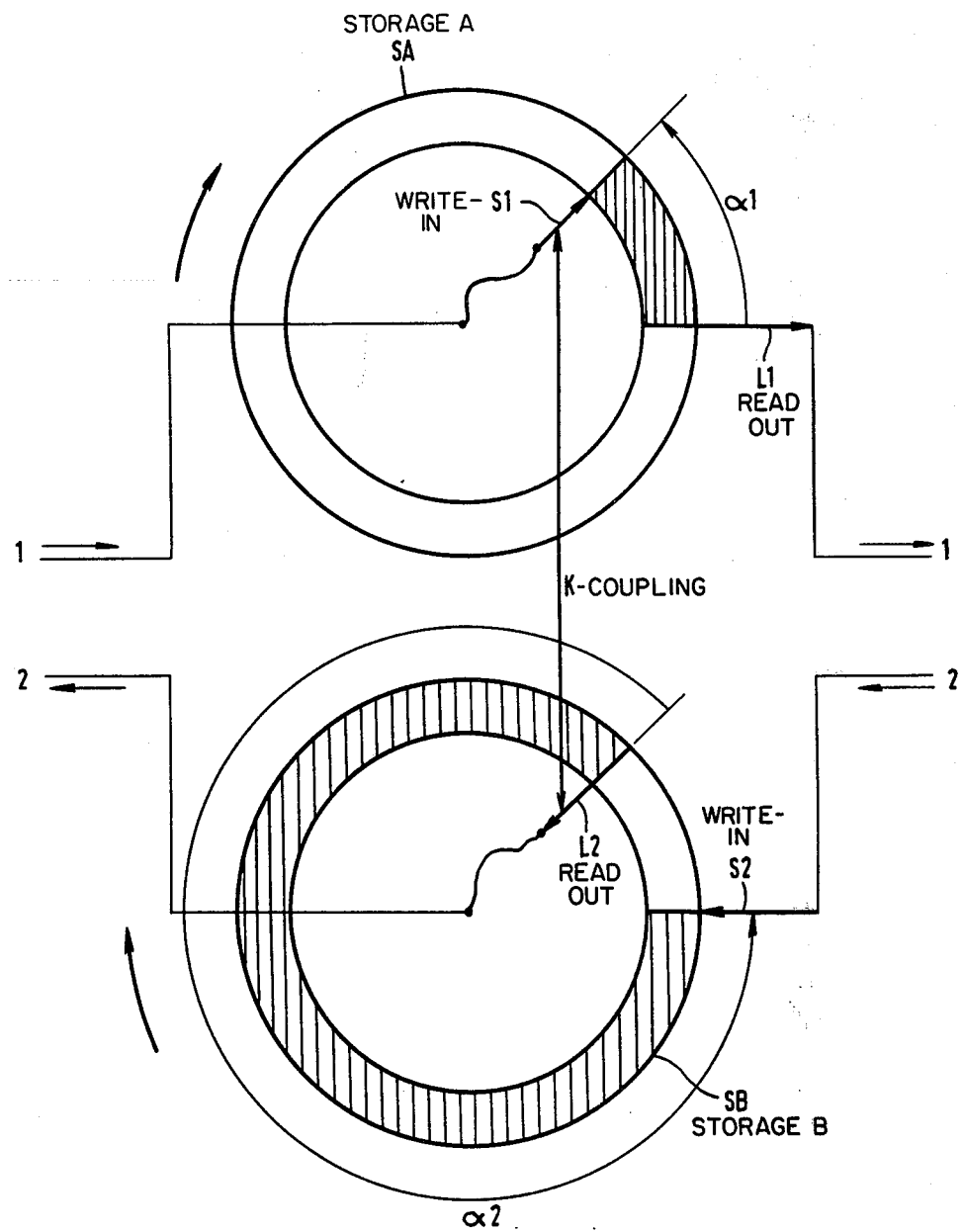
FIG. 4 shows the principle of two coupled storages for correlating the slip.

The principle of operation of two coupled storages SA and SB is shown in FIG. 4. The coupling, symbolized by the double arrow K, is provided by the fact that the angles $\alpha 1$ and $\alpha 2$ of the two storages sum to 360° (delay period = frame period). Since the arrows S1 and L2 can change their positions in relation to the arrows L1 and S2 only synchronously, because the value of the difference between the exchange clock rates ($1 T1-T2 1$) is automatically equal in both directions, they move across the arrows L1 and S2, respectively, at the same time. Because of the different directions of transmission, this results in an omission of information in one direction and in an addition of information in the other. According to the invention, this slip correlation is used to safeguard data.

Figure 5A:
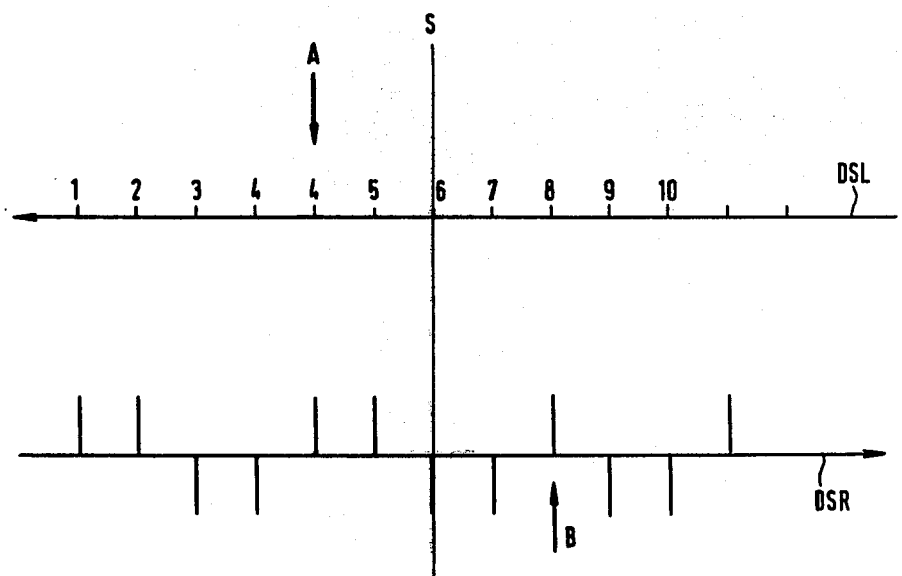
FIGS. 5a and 5b show the principle of slip detection with two coupled storages.
Figure 5B:
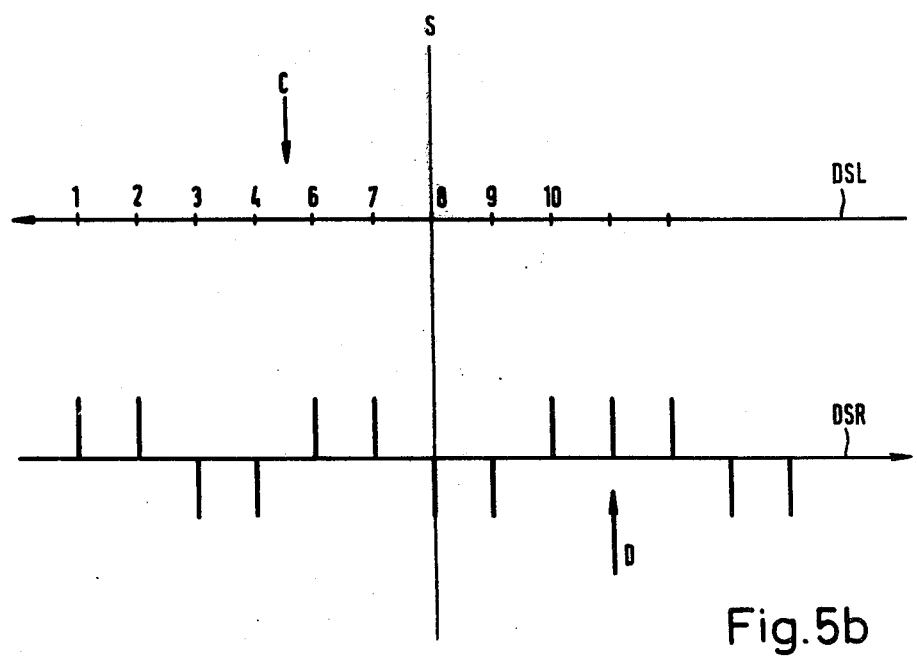

A slip-detecting principle which is possible with the slip correlation according to the invention is shown in FIGS. 5a and 5b. It is based on the fact that only one of the two transmission paths DSL and DSR, which both are or can be used for data transmission, is supervised for slip with the aid of check signals. This affords big advantages in practice, because only that one of the two transmission paths will be supervised which at that instant is carrying the weaker data stream. The transmission path carrying more data traffic will hereinafter be denoted by DSL, and the other transmission path by DSR.

FIGS. 5a and 5b show, on the transmission path DSL, the continuously numbered data items of a channel, which, in this example, travel from the transmission path DSL via the interface S to the switching grid of the exchange VST1. Check signals changing their value after, e.g., every second frame are transmitted from the switching grid of the exchange via the interface S onto the transmission path DSR. Because of the above-described slip correlation on both paths, addition of a data item on the transmission path DSL (arrow A) results in the simultaneous omission of a check signal (arrow B) on the transmission path DSR (case a, illustrated in FIG. 5a). This irregularity in the control signals can be detected in the data terminal by the check device and suitable, well-known equipment can cause the erroneous data items to be repeated, for example. In case b, (illustrated in FIG. 5b), omission of a data item on the transmission path DSL (arrow C) analogously results in a repeated check signal on the transmission path DSR (arrow D).

Thus, in the case of a data safeguard according to the invention, supervision with the aid of check signals is effected in the other transmission path DSR, carrying most of the traffic, whereby the full transmission capacity of the time-division switching network is available on one transmission path (DSL) because no check signals are needed there.

Looking again at the storages SA and SB shown symbolically in FIG. 4, it will be noticed that only part of the existing storage locations are occupied by the information (hatched portions). A location occupied in one storage is not occupied in the other.

Figure 6:
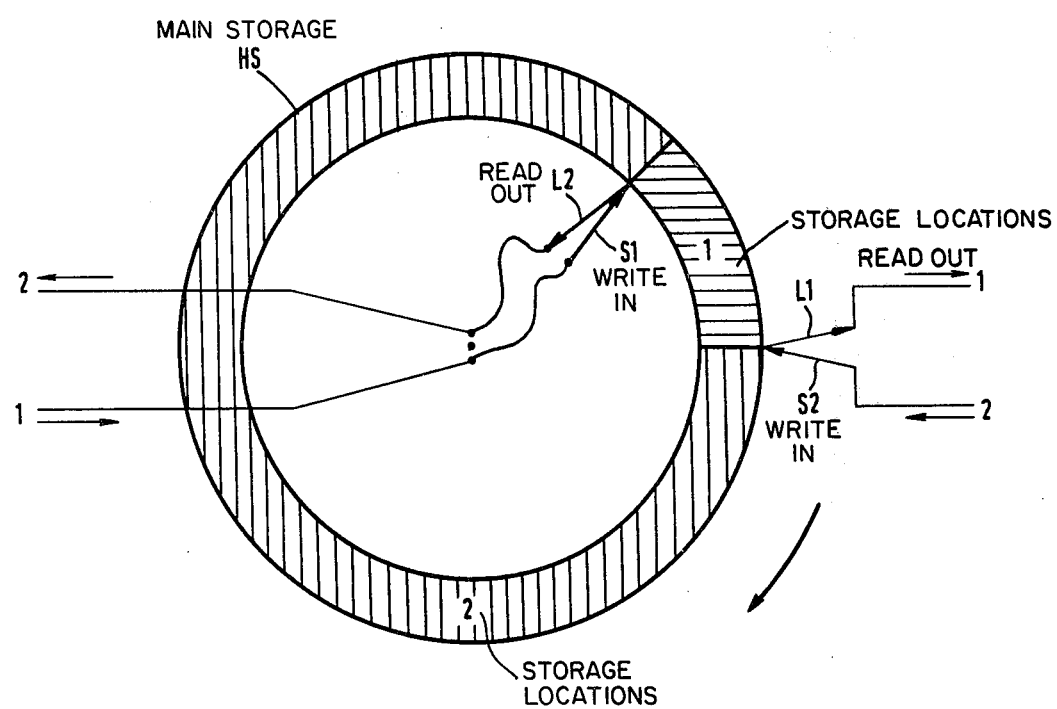
FIG. 6 shows a main storage for slip correlation.

In an improved embodiment of the invention, only a single main storage is provided instead of two storages SA and SB which, after a data item has been read from its location, replaces this data item by a data item from the other direction of transmission, whereby the capacity of this storage is fully utilized. FIG. 6 shows such a main storage HS symbolically. A data item is taken from a storage cell and replaced by the associated data item in the opposite direction before the equipment of the respective other direction (switching grid or transmission path) again has access to this cell. This is shown by a vertically hatched area (storage locations occupied by information from direction 1) and a horizontally hatched area (storage locations occupied by information from the other direction 2).

It must be considered, however, that in many time-division switching networks a definite time elapses until the switching grid, after receiving a data item, delivers the associated opposite data item. In these cases, the principle shown in FIG. 6 must be modified; through such a delay the arrows L1 and S2 move apart; if the arrows L2 and S1 were within the interspace obtained in this way, the storage would be functional. This case is shown in FIGS. 7b and 7c. FIG. 7 also shows the technical means which insure functionality in this case: a variable auxiliary storage H, whose capacity corresponds to the possible delay of the switching grid, and a direct path KW, which bypasses the main storage HS with the aid of the two switches A and B.

Figure 7A:
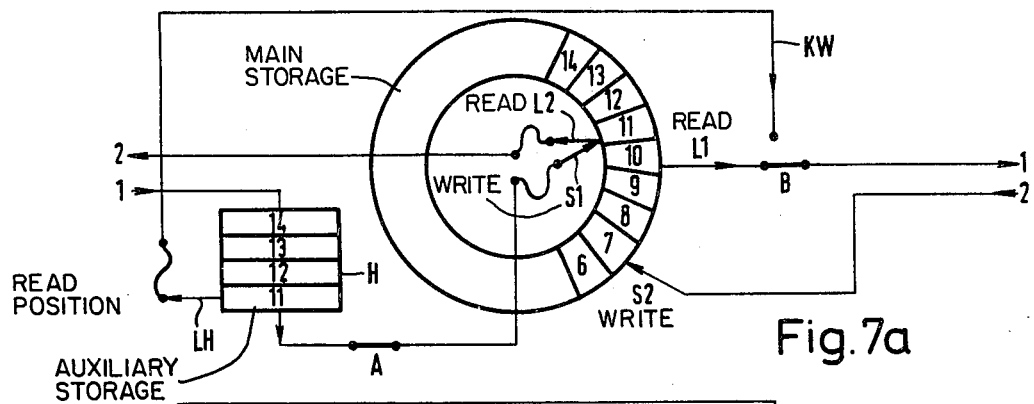
FIGS. 7a, 7b, 7c and 7d show a storage arrangement for slip correlation in case of delay in the switching network.
Figure 7B:
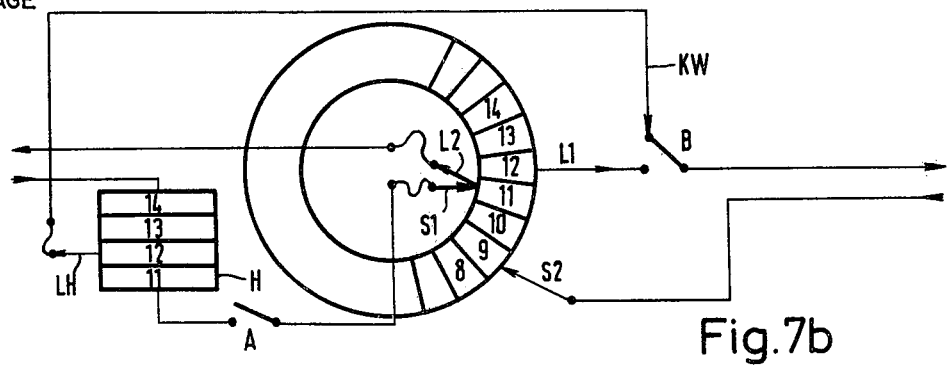
Figure 7C:
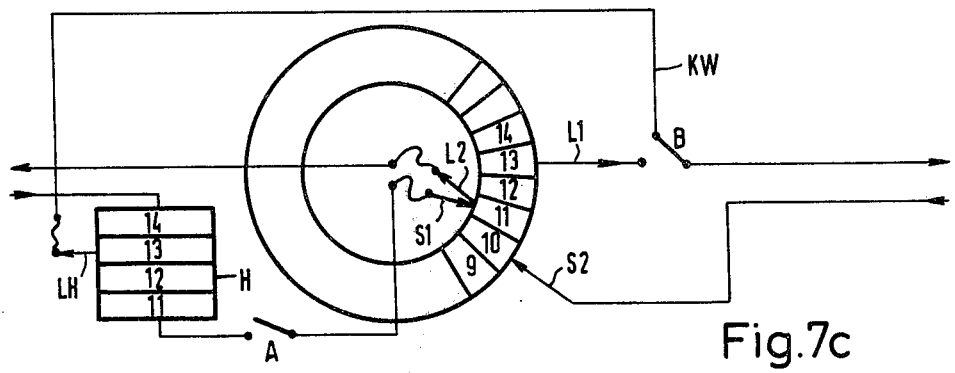
Figure 7D:
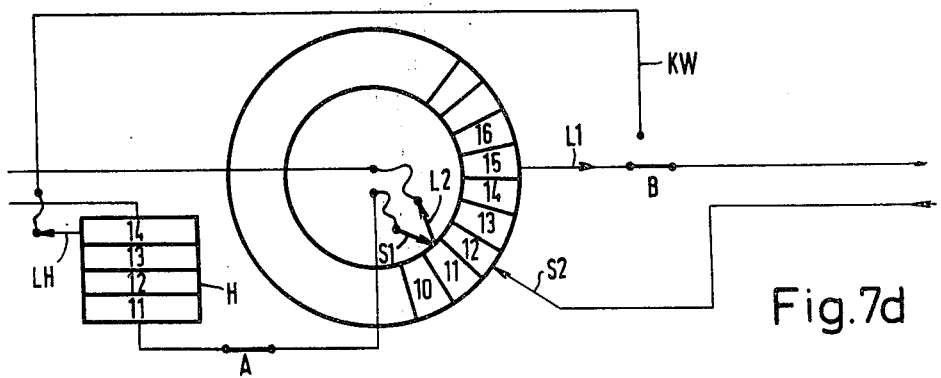

If the arrows L2 and S1 are outside the interspace formed by the arrows L1 and S2, the delay of the auxiliary storage H remains at the maximum value and the direct path KW is not used, cf. FIGS. 7a and 7d. If the arrows L2 and S1 move into the interspace, changeover to the direct path KW is effected by setting the auxiliary storage H to the read position (arrow LH) and switching the two switches A and B in a given time sequence. Thus, the main storage HS is used in only one direction, and the auxiliary storage H buffers the information in the other direction. The reverse operation takes place if the arrows L2 and S1 leave the interspace again.

Figure 8A:
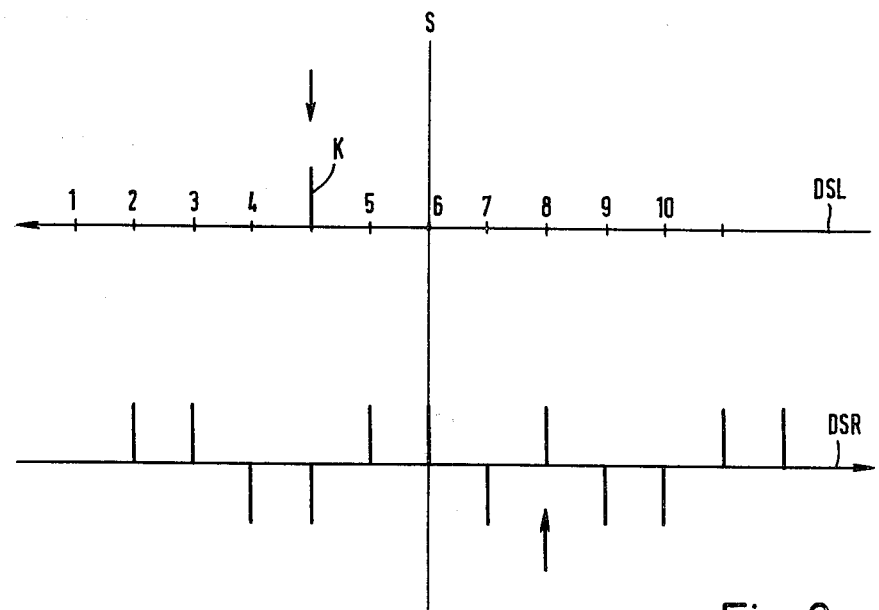
FIGS. 8a and 8b show the principle of slip detection with one storage.
Figure 8B:
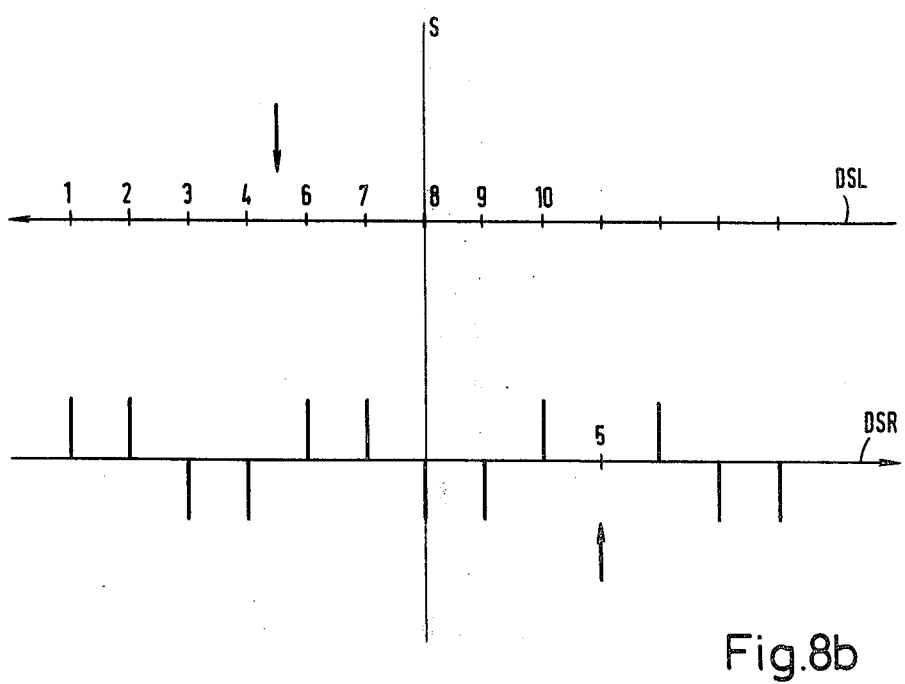

In this case, too, correlated slip occurs whenever the arrows L2 and S1 move across the arrow S2. As in the possibility explained above, this correlated slip can be used to safeguard data, with still another principle being possible, however. Since the same storage cells are used for both directions of transmission, in case of slip the respective data item is not repeated, but a data item from the other direction is inserted in its place; figuratively speaking, the data item of one direction is "reflected" from the interface S in the other direction. process will become clear by reference to FIGS. 8a and 8b, where these properties are utilized in advantageous manner for additional data safeguarding according to the invention. It is assumed that the preconditions are the same as those explained with reference to FIG. 5. In case a, shown in FIG. 8a, slip occurs on the transmission path DSL at the interface S as a result of "repetition", but the data item 4 is not repeated; instead, the check signal K, which has arrived at the interface S at the same time, is inserted into the data stream. In this case, too, a repetition (addition of the check signal) on the transmission path DSL results in an omission (of the check signal) on the transmission path DSR. In case b, shown in FIG. 8b, the reverse is the case, i.e., the data item 5 omitted on the transmission path DSL at the interface S is inserted into the stream of check signals on the transmission path DSR. In both cases, the irregularity in the check-signal sequence from the data transmitter can again be detected by check devices in the data terminals. An additional advantage is gained by the fact that in the case (a) the check signal inserted into the data stream can be immediately recognized as such by check devices in the data terminal directly and is simply extracted whereby a simple, automatic data safeguard against slip in the form of repetition on the path DSL is achieved. In this case, the check signals passing from the transmission path DSR to the data terminal need not be supervised for "omission of a check signal" provided that the data receiver can distinguish the signals reflected into the transmission path DSL in case of repetitions, e.g. control or acknowledgement signals, from the data to be transmitted.

While the principles of the invention have been described above in connection with specific apparatus and applications, it is to be understood that this description is made only by way of example and not as a limitation on the scope of the invention.

What is claimed is:

1. A system for switching and safeguarding data in time-division-multiplex switching networks in which both the two transmission paths between two neighboring time-division-multiplex exchanges, which paths are provided for one direction of transmission each, and a first input circuit to one exchange, which first input circuit is connected to the transmission paths and represents a synchronous group, are operated at the clock rate of said one exchange, and in which a second input circuit lying opposite said first input circuit and representing an asynchronous group is operated so that read and write operations to or from the transmission paths take place at the clock rate of said one exchange, while read and write operations to or from the switching grid of of the other exchange take place at the clock rate of the other exchange, wherein the improvement comprises means in the asynchronous group to correlate slips in the timing of signals on the two transmission paths and particularly to cause said slips to coincide in time.

2. The invention according to claim 1, in which the means in the asynchronous group includes two storage means identical in construction, with each storage means alotted to one direction of transmission, and both storage means are coupled together in such a manner that the sum of the delay periods of an incoming data item and of the associated outgoing data item is equal to one frame period or to an integral multiple thereof.

3. The invention as claimed in claim 1, in which the means in the asynchronous group include main storage means whose locations are available to both incoming and outgoing data items, with the sum of the delay periods of an incoming (outgoing) and outgoing (incoming) data item being equal to one frame period or to an integral multiple thereof.

4. The invention as claimed in claim 1, in which the means in the asynchronous group includes a main storage alotted to both directions of transmission, an auxiliary storage, and a direct path which are so controlled that delays in the switching grid of one exchange are included in the sum of the delay periods.

5. A system for switching and safeguarding data in time-division-multiplex switching networks according to claim 3, in which a signal having passed from one transmission path to the other transmission path as a result of slip is available to be detected and extracted.

6. A system for switching and safeguarding data in time-division-multiplex switching networks according to claim 5, in which the signals on one transmission path differ from the signals on the other transmission path in such a manner that a signal having passed from one transmission path to the other as a result of slip can be recognized there as being extraneous and then suppressed.

* * * * *